United States Patent [19]

Sollami

[11] Patent Number: 4,823,678
[45] Date of Patent: Apr. 25, 1989

[54] ROTARY ACTUATOR

[76] Inventor: Phillip A. Sollami, 1300 E. Pine, Herrin, Ill. 62948

[21] Appl. No.: 112,296

[22] Filed: Oct. 26, 1987

[51] Int. Cl.⁴ .............................................. F01C 9/00
[52] U.S. Cl. ........................................ 92/125; 92/121
[58] Field of Search .................... 92/121, 125, DIG. 2

[56] References Cited

U.S. PATENT DOCUMENTS

| | | | |
|---|---|---|---|
| 2,902,009 | 9/1959 | Ludwig et al. | 92/125 X |
| 2,960,076 | 11/1960 | Henry | 92/125 |
| 3,021,822 | 2/1962 | Rumsey | 92/125 X |
| 3,023,741 | 3/1962 | O'Connor | 92/125 X |
| 3,128,679 | 4/1964 | Trendle | 92/125 X |
| 3,426,654 | 2/1969 | Laughman | 92/125 |
| 4,475,738 | 10/1984 | Eicher et al. | 92/122 |
| 4,495,856 | 1/1985 | Sollami | 92/125 |

*Primary Examiner*—Robert E. Garrett
*Assistant Examiner*—Mark A. Williamson
*Attorney, Agent, or Firm*—Edmond T. Patnaude

[57] ABSTRACT

Each of the head assemblies of a rotary actuator includes a tapered roller bearing in which the shaft of the actuator is journaled and an end plate against the inner face of which the stator and movable vanes of the actuator are sealed by a resilient jacket. A pressure equalizing passageway extends through each end plate from the cavity in which the associated roller bearing is mounted to the gasket which seals the stator to the end plate, thereby to equalize the pressure across the end plate and reduce the torque required to initially rotate the actuator shaft.

5 Claims, 4 Drawing Sheets

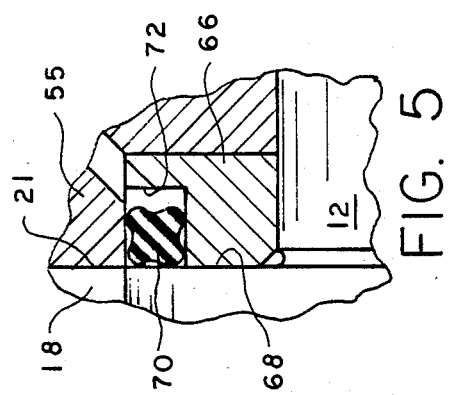
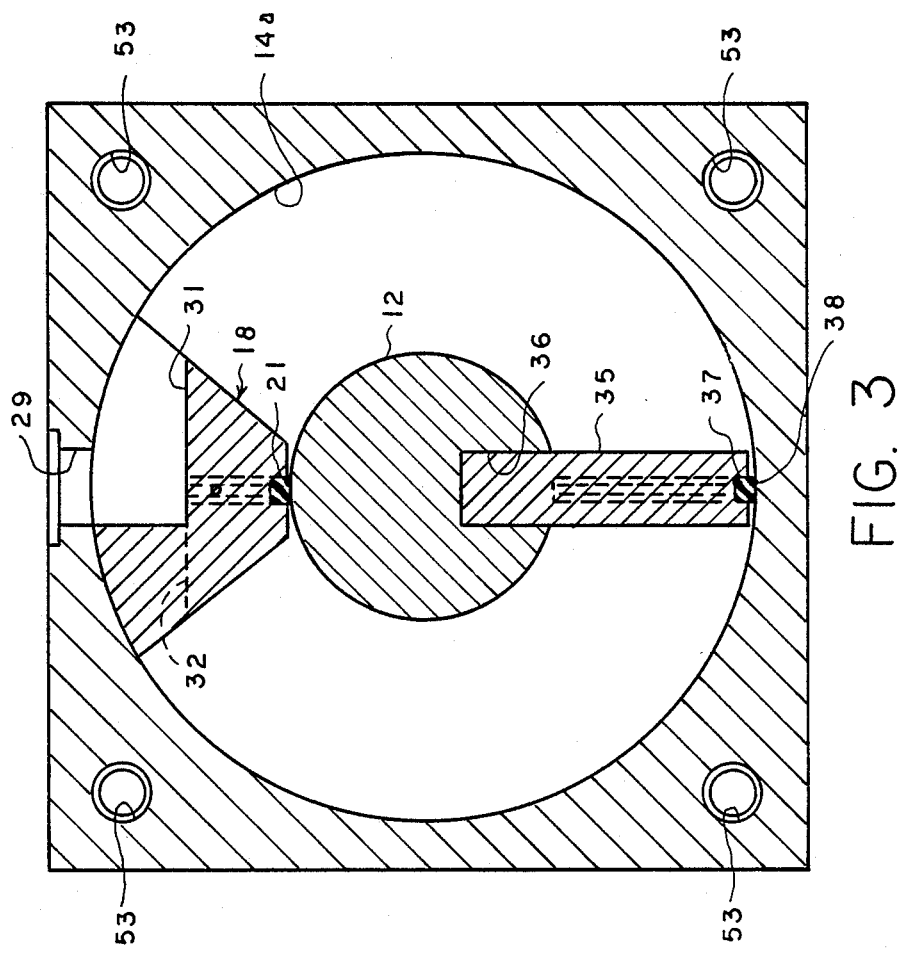

ROTARY ACTUATOR

The present invention relates in general to a novel fluid-operated rotary actuator, and it further relates to a new and improved end seal between the rotor and the stator of a fluid operated positive displacement device.

BACKGROUND OF THE INVENTION

Fluid-operated oscillatory rotary actuators of the type embodying a radial vane mounted on a shaft for oscillatory movement of the vane in a generally cylindrical fluid operating chamber between opposite sides of a radial stator are well known as evidenced by U.S. Pat. Nos. 3,128,679; 3,131,610 and 3,215,046. U.S. Pat. Nos. 4,495,856 and 4,656,925 describe rotary actuators of this general type having improved seals for preventing leakage of fluid from the operating chamber of the actuator to the ambient and for preventing leakage of the operating fluid from the high pressure side to the low pressure side of the chamber around the end surfaces of the vane and the stator.

When rotary actuators using the prior art type seals have been used as torque resistances, such as in exercise machines, the initial or break-away resistance provided by the seals in the actuators have been greater than desired, and it would therefore, be desirable to provide such actuators with seals having an extremely low break-away or initial resistance.

Also it would be desirable to minimize the axial and radial movement of the shafts in rotary actuators and to minimize the deflection of the end plates against which the ends of the stators and vanes are sealed.

SUMMARY OF THE INVENTION

Briefly, there is provided in accordance with the teachings of the present invention a new and improved rotary actuator having a head assembly utilizing substantially non-deformable end plates which are affixed to the head members and which respectively enclose one of a pair of tapered races adjacent to the roller bearings in which the shaft of the actuator is journaled. A narrow pressure equalizing passageway extends through each of the end plates between the space occupied by the roller bearings and the operating chamber within the actuator to equalize the pressure at the roller bearings with that in the main operating chamber in order to prevent the unwanted deflection of the end plates toward the ends of the vane. In the absence of the pressure equalizing passageways relatively massive end plates must be used to prevent inward deflection of the end plates with a consequent frictional drag on the vane.

If desired, the head may be of solid construction since the pressure equalizing passageway still has the same effect i.e., excessively high sealing pressures are not allowed to build up in te bearing cavity area.

In addition to the above, the present invention provides novel loose fitting, sliding seals between the shaft and the inner diameter of the end plates and the shaft to prevent fluid from passing from the high pressure side of the vane to the low pressure side of the vane at the juncture of the inner diameter of the end plate, the shaft and the vane. Such seals are initially loose and thus present a low break-away resistance. However, because the pressure in the operating chamber at the leading side of the vane increases as the shaft is rotated, the seals are moved and compressed by the pressure differential into tight sealing engagement with the shaft.

GENERAL DESCRIPTION OF THE DRAWINGS

The present invention will be better understood by a reading of the following detailed description of the drawings wherein:

FIG. 3 is a cross-sectional view taken along the line 3—3 of FIG. 1 assuming the entire actuator to be shown in FIG. 1;

FIG. 5 is a fragmentary, sectional view of a preferred embodiment of the invention.

DETAILED DESCRIPTION OF A PREFERRED EMBODIMENT OF THE INVENTION

Figure 1:
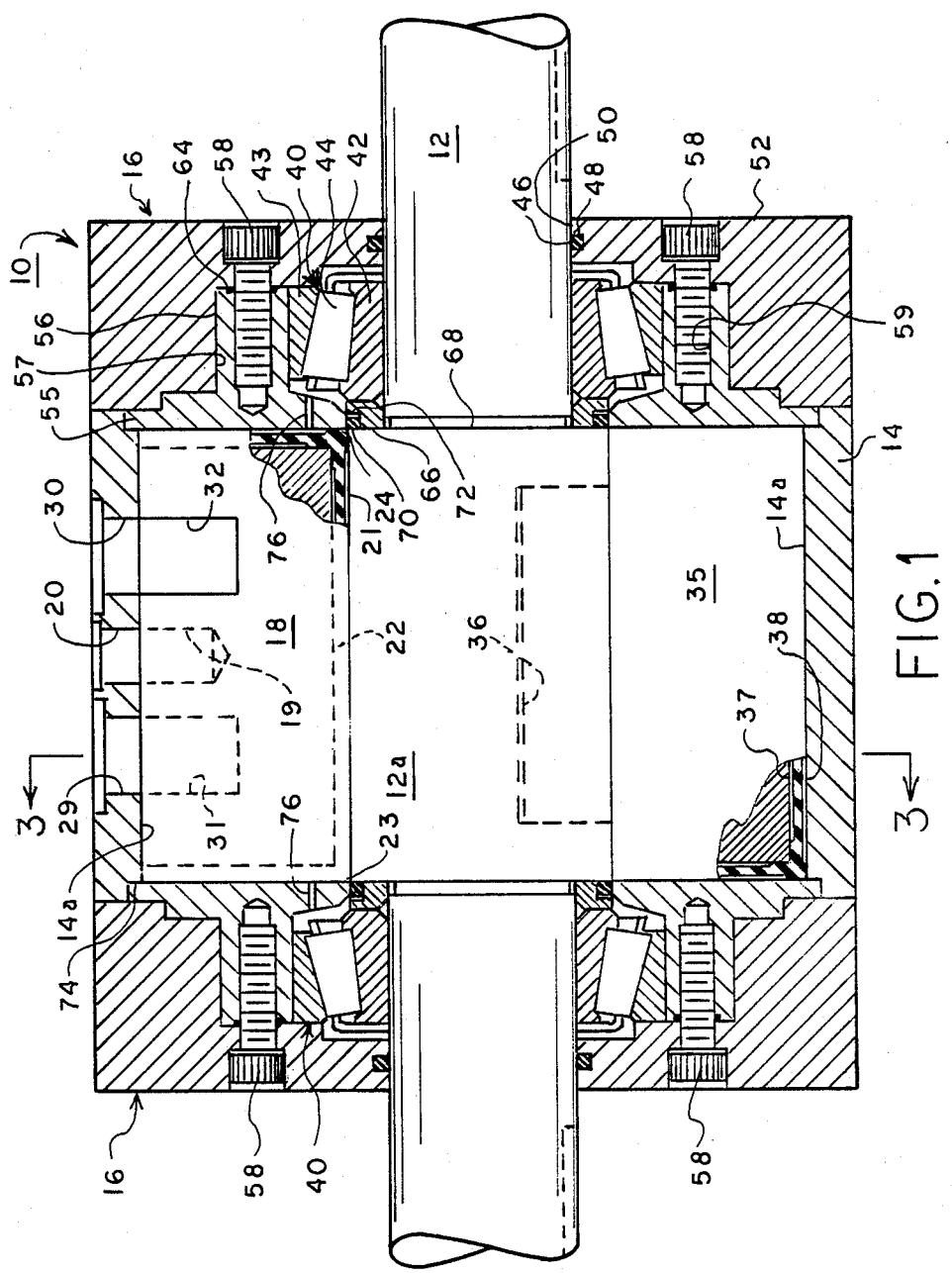
FIG. 1 is a longitudinal cross-sectional view of a rotary actuator embodying the present invention.
Figure 2:
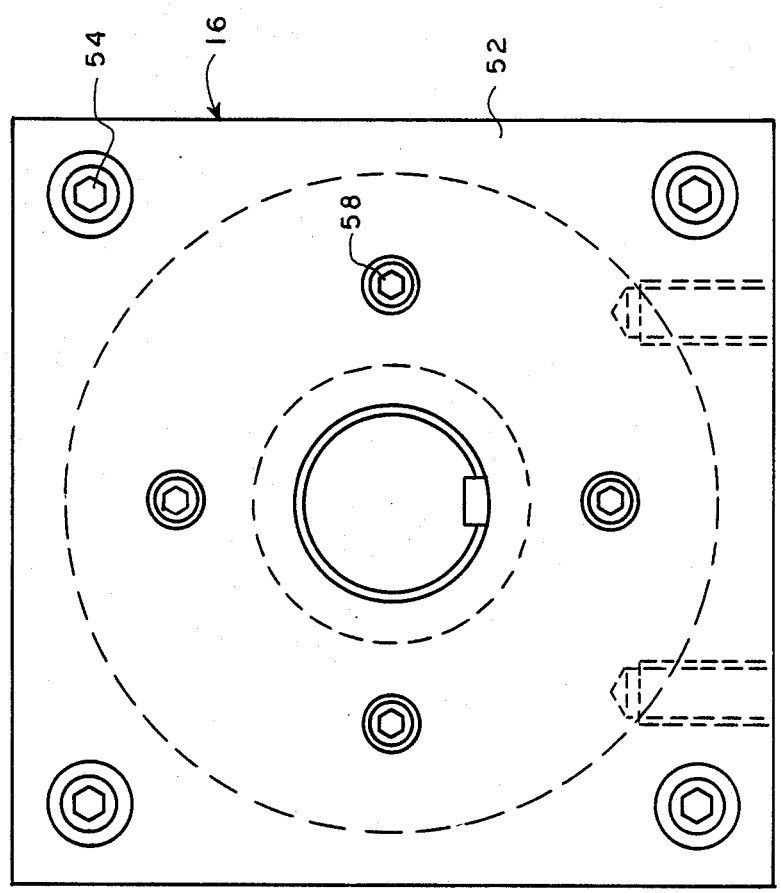
FIG. 2 is an end view of the rotary actuator shown in FIG. 1.
Figure 4:
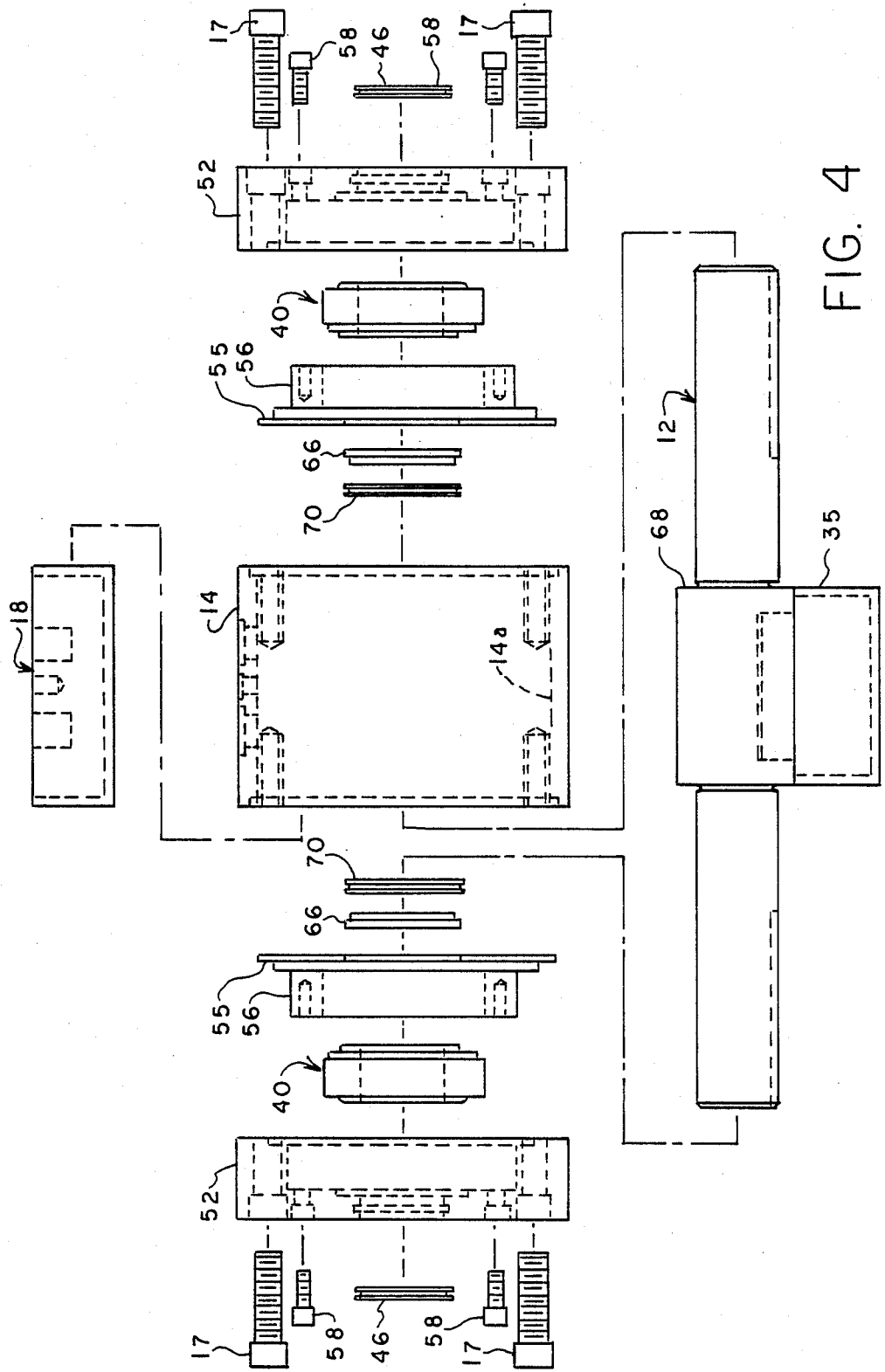
FIG. 4 is an exploded front elevational view of the rotary actuator shown in FIG. 1.

Referring to FIGS. 1 and 4, a fluid operated oscillatory rotary actuator 10 may be seen to include a drive shaft 12 journaled for rotation in a generally cylindrical housing made up of a tubular body member or sleeve 14 to the respective ends of which a pair of identical head assemblies 16 are fixedly and sealably connected by four bolts 17. A stator 18 is sealably and fixedly mounted against the inner cylindrical wall 14a of the body 14 by a plurality of suitable studs (not shown) threadedly received in blind hole 19 in the stator 18, which hole is aligned with a transverse hole 20 in the body member 14. The stator 18 is sealed at its respective ends to the head assemblies 16 by a resilient, U-shaped quad ring seal 21. The seal 21 is best shown in cross section in FIG. 3 and is mounted in a U-shaped groove 22 in the edge of the stator 18 with the intermediate, longitudinally extending portion of the seal 21 sealably engaging the intermediate section 12a of the shaft 12 as also shown in FIG. 3.

The seal 21 consists of four intermediate longitudinal grooves which terminate a short distance from the corners 23 and 24 as shown in FIG. 1.

A pair of fluid inlet and outlet ports 29 and 30 which extend through the body member 14 are in alignment with respective ones of two passageways 31 and 32 in the stator 18. The passageway 31 may be seen in FIG. 3 to open into the operating chamber on one side of the stator 18 and the passageway 32 to open into the operating chamber on the other side of the stator 18. Suitable fittings may be tightly threaded into the ports 29 and 30 and into the radial portions of the passageways 31 and 32 to assist in holding the rotor 18 in place and to carry inlet and outlet fluid to and from the operating chamber.

A radial vane 35 is affixed to the shaft 12 and as shown in FIG. 1, may be seen to extend from one head assembly 16 to the other. Considered more particularly, the vane 35 is mounted in a longitudinal slot 36 in the intermediate section of the shaft 12 and is provided in its edges with a U-shaped groove 37 in which a four lobed quad seal 38 is mounted to seal the vane to the head assemblies 16 and to the inner cylindrical surface 14a of the body sleeve 14. Preferably the seal 38 is a four lobed quad ring of the same construction as the seal 21 but other suitable cross-sectional configurations may be used.

The head assemblies 16 are identical, and each includes a conventional annular thrust bearing 40 having an inner race 42, an outer race 43 and a plurality of tapered rollers 44 disposed between the inner and outer races. The thrust bearing 40 may be of any suitable type which is commercially available. If desired, however, the tapered roller bearing may be replaced by other types of radial bearings and thrust bearings.

In order to seal the shaft 12 to the head assemblies 16 annular seals 46 are respectively mounted in annular grooves 48 provided in the central bore 50 of a head member 52. As viewed from the end, the head member 52 is square in overall cross-section but it could, if desired, be round.

Each of the head assemblies 16 further includes an end plate 55 which is generally circular in overall cross-sectional configuration and includes a cylindrical annular flange 56 which snugly fits into a counterbore 57 in the associated head member 52. The flange 56 rigidifies the end plate to reduce any possible deflection thereof. Each end plate 55 is affixed to its associated head member 52 by means of four machine screws 58 which extend through holes in the head member 52 into threaded, blind holes 59 in the flange 56. The holes 59 are threaded to threadedly receive the screws 58. Four O-ring seals 64 respectively surround the holes 59 and are compressed between the head member 52 and the outer end of the flange 56 to seal the end plate 55 to the head member 52. The peripheral portions of the end plates 55 fit snugly into rabbits 74 in the ends of the body member 14.

An annular thrust bushing 66 is slip fitted onto the shaft 12, and as shown best in FIG. 1 is positioned between the inner end of the inner race 42 and an annular shoulder 68 on the shaft 12. It may be seen that the intermediate portion of the shaft 12 disposed within the operating chamber in the body sleeve 14 is larger in diameter than the outer portions of the shaft 12 and is delineated by the shoulders 68. In accordance with an important feature of the present invention an annular gasket 70 formed of a resilient material is loosely mounted in an annular groove 72 in the thrust bushing 66 to provide a seal between the shaft 12 and the inner diameter of the end plate 55 as well as to prevent leakage of operating fluid from one side of the stator to the other side of the stator and from one side of the vane 35 to the other side of the vane 35. The particular construction of this seal and the manner in which it functions is described more fully hereinafter in connection with FIG. 5.

Each of the end plates 55 is provided with a pressure equalizing passageway 76 which extends through the end plate from the space adjacent the bearing 40 and on the inside of the flange 56 to the center of the four lobed quad ring seal 21 on the stator 18. The cavity behind the seal 70 maintains a pressure sufficient to keep the seal 70 pressed against shoulder 68 of shaft 12 once all air has been evacuated from all inner chambers of the actuator.

The pressure equalizing passage 76 is positioned centrally of the four lobed quad ring seal. As explained above, the seal 21 is solid at the corners 23 and 24 wherefor the groove in the quad seal 21 does not have an exit to the chamber of body 14, except around the adjacent lobes of the quad ring seal. Since the two quad ring lobes are compressed against the adjacent surface of end plate 55, no fluid can escape except when the pressure of the fluid exceeds the force the seal applies against the surface of end plate 55. The by-pass fluid pressure is generally between 25 PSI to 150 PSI, depending on the amount of seal squeeze. It has been found that when hydraulic pressure is maintained through the pressure equalizing passage 76 the by-pass of fluid and end plate deflection is minimized or eliminated.

When the rotary actuator 10 is used to resist rotation of the shaft 12 as, for example, where the rotary actutator 10 is used in an exercising machine or as a brake, it is important that the inital or breakaway resistance exerted on the shaft 12 by the rotary actuator 10 can be minimized. When the prior art type seal as disclosed, for example, in U.S. pat. No. 4,656,925 is used, the friction between that sealing gasket and the shaft is relatively great so that the initial breakaway torque is higher than desired.

In accordance with an important aspect of the present invention the annular seal 70 has a slightly smaller longitudinal dimension than does the annular groove 72 in which it is mounted. This permits the seal 70 to slide a short distance longitudinally in the groove 72 between the illustrated position in sealing engagement with the shoulder 68 on the shaft 12 and a position where it is spaced from the shoulder 68. When the shaft 12 is in a stationary position, the pressure drop across the seal 70 is between 25 PSI and 150 PSI inasmuch as the backside thereof is connected through the pressure equalizing passage 76 to the operating chamber and thus to the inner side of the seal 70. In this condition the seal 70 provides a slight pressure to keep the quad seal in place against shoulder 68. However, when the shaft 12 is being rotated by the application of an external torque thereto, the pressure on the leading side of the vane 35 increases. The increased pressure is coupled through the passage 76 to the rear side of the seal 70 and forces the gasket to get into a greater compressed sealing realtionship with the shoulder 68 on the shaft 12 to minimize and prevent leakage of operating fluid from the leading and high pressure side of the vane 35 to the trailing and low pressure side of the vane 35.

It may thus be seen that the seal 70 only slightly resists initial rotation of the shaft 12, but once the shaft is rotating the seal 70 is more tightly compressed between the shaft 12 and the gaskets 21 and 38 on the stator 18 and on the vane 35 to seal the high pressure side of the operating chamber from the low pressure side and thus provide a resistance to torque as determined by the resistance to fluid flow provided between the passageways 29 and 30 externally of the rotary actuator.

Also, the provision of the flanges 56 on the end plates 55 and the cartridge like mounting of the thrust bearings therein further reduces the unwanted deflection of the end plates.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:
1. In a fluid operated oscillatory rotary device of the type including a body having a cylindrical bore therein, first and second head assemblies fixedly mounted to said body over the respective ends of said bore to define a generally cylindrical operating chamber in said bore between said first and second head assemblies first and second annular bearings respectively mounted in said head assemblies, a shaft journaled in said annular thrust bearings, a stator affixed to said body and extending radially into said bore, a vane affixed to said shaft and extending radially from said shaft, first sealing means carried by said stator and sealing said stator to said head assemblies and to said shaft, and second sealing means carried by said vane and sealing said vane to said head assemblies and to the cylindrical wall of said bore, the improvement residing in at least one of said head assemblies and comprising in combination

- a head member having a central bore and a counterbore through which said shaft extends,
- an annular end plate disposed in said counterbore and having an annular peripheral portion compressed between said head member and said body,
- said end plate having a planar annular surface in sealing engagement with said first and second sealing means and further having an annular flange defining a cylindrical cavity in which said first annular thrust bearing is disposed,
- means fixedly securing said end plate to said head member, annular resilient sealing means surrounding said shaft and sealing said shaft to said end plate to prevent the flow of fluid in said cavity from one side of said vane to the other, and
- a passageway through said end plate for carrying fluid from said operating chamber to the side of said resilient sealing means remote from said operating chamber.

2. The combination set forth in claim 1 comprising
an annular thrust bushing having an annular groove defining an annular outer wall surface,
said annular resilient sealing means being disposed in said annular groove and held in compression against said end plate.

3. The combination set forth in claim 2 wherein
said annular groove has a longitudinal dimension which is greater than the corresponding dimension of said annular resilient sealing means to permit axial movement of said annular resilient sealing means in said annular groove.

4. The combination set forth in claim 2 wherein
said annular groove has an axial dimension which is less than the corresponding dimension of said annular resilient sealing means to maintain said resilient sealing means in axial compression.

5. In a fluid operated reciprocatory rotary motor of the type including a body having a cylindrical bore therein, first and second head assemblies fixedly mounted to said body over the respective ends of said bore to define a generally cylindrical chamber in said bore between said first and second head assemblies first and second annular bearings respectively mounted in said head assemblies, a shaft journaled in said annular bearings, a stator affixed to said body and extending radially into said bore, a vane affixed to said shaft and extending radially from said shaft, first sealing means carried by said stator and sealing said stator to said head assemblies and to said shaft, and second sealing means carried by said vane and sealing said vane to said head assemblies and to the cylindrical wall of said bore, the improvement residing in at least one of said head assemblies comprising in combination

- a head member have a central bore and a counterbore through which said shaft extends,
- means securing said head member to the ends of said body with said counterbore facing said cylindrical bore in said body,
- an annular end plate having an annular cylindrical flange and having an external surface complementary to said counterbore,
- said cylindrical flange being fitted in said counterbore,
- a plurality of bolts securing said end plate to said head member,
- one of said annular bearings being fitted in said cylindrical flange, and
- said end plate having a planar annular surface in sealing engagement with said first and second sealing means and an annular peripheral portion compressed between said head member and said body.

* * * * *